US012705425B1

(12) United States Patent
Reouveni et al.

(10) Patent No.: US 12,705,425 B1
(45) Date of Patent: Aug. 11, 2026

(54) SYSTEMS AND METHODS FOR THE DETECTION AND DISAMBIGUATION OF ENTITIES IN NATURAL LANGUAGE CONVERSATION

(71) Applicant: Outbound AI Inc., Seattle, WA (US)

(72) Inventors: Ronen Reouveni, Phoenix, AZ (US); Robert Piro, Ellensburg, WA (US); Crispin Conrad Vaughan Claude Andrew, Tacoma, WA (US); Jonathan Wiggs, Seattle, WA (US)

(73) Assignee: Outbound AI Inc., Seattle, WA (US)

( * ) Notice: Subject to any disclaimer, the term of this patent is extended or adjusted under 35 U.S.C. 154(b) by 138 days.

(21) Appl. No.: 18/902,598

(22) Filed: Sep. 30, 2024

Related U.S. Application Data

(60) Provisional application No. 63/543,567, filed on Oct. 11, 2023.

(51) Int. Cl.
*G06F 40/289* (2020.01)
*G06F 16/334* (2025.01)

(52) U.S. Cl.
CPC ........ *G06F 40/289* (2020.01); *G06F 16/3344* (2019.01)

(58) Field of Classification Search
CPC .......................... G06F 40/289; G06F 16/3344
See application file for complete search history.

(56) References Cited

U.S. PATENT DOCUMENTS

| | | | | |
|---|---|---|---|---|
| 2021/0103700 | A1* | 4/2021 | Toplyn | G06F 40/10 |
| 2023/0196813 | A1* | 6/2023 | Muthu | G06V 30/414 382/190 |

* cited by examiner

*Primary Examiner* — Carolyn R Edwards
(74) *Attorney, Agent, or Firm* — Alan D. Minsk; FisherBroyles, LLP

(57) ABSTRACT

A system and associated methods for implementing a methodology for performing a disambiguation of extracted data, such as entities in a textual version of a conversation. The method enables a general-purpose entity extractor to be adapted for use with contextual information such as a domain specific field and to be able to do so without additional retraining. This enables a user to extract data and associate it with a label, field name, or other indicator of context or meaning. The association of the extracted data to the indicator of context or meaning may assist in the processing of a conversation, navigation of conversation, interpretation of a field value, or another similar task.

20 Claims, 5 Drawing Sheets

SYSTEMS AND METHODS FOR THE DETECTION AND DISAMBIGUATION OF ENTITIES IN NATURAL LANGUAGE CONVERSATION

CROSS REFERENCE TO RELATED APPLICATION

This application claims the benefit of U.S. Provisional Application No. 63/543,567, filed Oct. 11, 2023, entitled "Systems and Methods for the Detection and Disambiguation of Entities in Natural Language Conversation", the disclosure of which is incorporated, in its entirety (including the Appendix) by this reference.

BACKGROUND

Autonomous extraction of data for a domain specific task is a more complex problem than it might seem. While various pre-trained tools such as AWS Comprehend[1] can detect entities, these are not ideal solutions. The detected entities may include fields such as dates, monetary amounts, names, organizations, and alpha-numeric sequences. However, the conventional approaches and solutions do not directly relate what has been extracted to a preexisting criterion or other additional information about the extracted data. That is, the context or meaning of the extracted data is not known as a result of the extraction process.

[1] A cloud-based service provided by Amazon's AWS infrastructure.

For example, AWS Comprehend can identify a date, but is unable to provide a way of knowing what that date is referring to, i.e., its context. For example, a date could be a date of service, a birthday, part of an agreement, or other date that is contained in a field without additional information as to its meaning. Further, even if a partial context is known (such as a date is known to be a birthday), that may be insufficient information to properly interpret the extracted data (e.g., it may not be clear whose birthday the date is referencing or how that birth date relates to other available information).

Although it may be possible to train a custom model to perform an extraction and interpretation function, that approach has its own disadvantages. These include the need for a large set of properly annotated or labeled training data and a limit on the number of custom entities that can be used.

As these non-limiting examples make clear, in many cases it is not possible to understand the meaning or significance of data (such as a date) without knowing more about its context or how it relates to other information. This suggests the desirability of using additional systems or processes to disambiguate or interpret extracted entities (such as strings of alphanumeric symbols) and relate them back to specific criterion or other configurable fields.

Embodiments of the disclosed systems, apparatuses, and methods introduce a methodology for performing a disambiguation of extracted data, such as entities in a textual version of a conversation. Embodiments are also directed to solving disadvantages of conventional approaches used for the extraction and interpretation of data, either alone or in combination.

SUMMARY

The terms "invention," "the invention," "this invention," "the present invention," "the present disclosure," or "the disclosure" as used herein are intended to refer broadly to the subject matter disclosed in this document, the drawings or figures, and to the claims. Statements containing these terms do not limit the subject matter disclosed or the meaning or scope of the claims. Embodiments covered by this disclosure are defined by the claims and not by this summary. This summary is a high-level overview of various aspects of the disclosure and introduces some of the concepts that are further described in the Detailed Description section below. This summary is not intended to identify key, essential or required features of the claimed subject matter, nor is it intended to be used in isolation to determine the scope of the claimed subject matter. The subject matter should be understood by reference to appropriate portions of the entire specification, to any or all figures or drawings, and to each claim.

In one or more embodiments, the disclosure is directed to a system and associated processes that enable a general-purpose entity extractor, such as AWS Comprehend, to be adapted for use with contextual information such as a domain specific field and be able to do so without additional retraining. This enables a user to extract data and associate it with a label, field name, or other indicator of context or meaning. The association of the extracted label to the indicator of context or meaning may assist in the processing of a conversation, navigation of a conversation, interpretation of a field value or other similar task.

As non-limiting examples, the following represent situations in which a combination of an extracted entity and information regarding its context may be useful and/or needed to be able to "understand" the meaning or use of an item of extracted data:

- If a user was asked to email information about themselves. In this situation, an embodiment could be used to structure that data;
- If one wanted to find information in unstructured data or raw text, and turn that into structured information, an embodiment would be able to assist in performing this task;
- Processing of transcripts for a call center to obtain useful information from the text derived from an audio recording;
- Application of an embodiment of the disclosed approach can be used to determine events, dates of birth, dates of service, claim received dates, claim processed dates, dollar amounts and context, denied amounts, paid amounts, addresses for payments, or addresses for service, as non-limiting examples;
- An embodiment of the disclosed approach may be used to identify appointment times from voicemails or extract callback numbers, as further non-limiting examples.

In a general sense, a conversation for which a person is able to associate an entity with its context may benefit from use of an embodiment of the disclosed and/or described approach. For example, assume a person calls a friend and leaves a voicemail saying they and the friend will go for a hike at 10:30, then go for lunch at 2 μm, a movie at 5 μm, and dinner at 9 μm. An embodiment of the disclosed system with the correct configuration could turn that into a structured schedule, including an associated time for each event (as a form of a speech-to-text calendaring or a scheduling application).

Embodiments of the disclosed systems, apparatuses, and methods introduce a methodology to overcome the limitations of conventional general-purpose extraction approaches. In some embodiments, a solution to the limitations of conventional approaches is the application of a combination of language detection and distance disambiguation. As an example, instead of searching for entities using AWS Comprehend, embodiments search for keywords and identify words associated with keywords.

In some embodiments, there are two main methods used to search for keywords. The first is an application of Levenshtein distance, a known algorithm for comparing words or phrases.[2] The second method is an algorithm termed "proximity search", developed by the inventors of the disclosure. In using each method, a process begins with searching for a configured or specified keyword phrase. For example, the keyword phrase might be "the date of service".

[2]In information theory, linguistics, and computer science, the Levenshtein distance is a string metric for measuring the difference between two sequences. Informally, the Levenshtein distance between two words is the minimum number of single-character edits (insertions, deletions, or substitutions) required to change one word into the other. Wikipedia.

In a typical use case, the information obtained from the disclosed processing (e.g., field value and context) may be used as an input to a process that navigates through a conversation to determine how best to provide information, or a service desired by a user. In such cases, an audio segment containing speech may be converted to text and then processed using embeddings, clustering, distance metrics, and associated logic (which may include a threshold or comparison value) as part of a decision process that determines how to respond to a segment of speech. In such a use case, the response would be based (at least in part) on the extracted value and its context.

As a non-limiting example, an audio input could be converted to text (i.e., transcribed) in real-time. Following the transcription, the text could be grouped into a set of categories, such as "intent" or characteristics of an order. The text could then be translated or converted to an embedding. Next, the embeddings and intents/labels can be used as the basis for training a machine learning model. The training would cause the model to "learn" the relationship between the embeddings and intent/label. Each embedding may be assumed to include an intent and an entity that the intent applies to. This could then be used to decide if additional information was needed and/or how best to respond to a user.

In one embodiment, the disclosure is directed to a system to enable a general-purpose entity extractor, such as AWS Comprehend, to be adapted for use with contextual information such as a domain specific field and be able to do so without additional retraining. The system or an apparatus may include a set of computer-executable instructions stored in (or on) a memory or data storage component (such as one or more non-transitory computer-readable media) and one or more electronic processors or co-processors. When executed by the processors or co-processors, the instructions cause the processors or co-processors (or a device of which they are part) to perform a set of operations that implement an embodiment of the disclosed method or methods.

In one embodiment, the disclosure is directed to a set of computer-executable instructions stored in (or on) one or more non-transitory computer-readable media, wherein when the set of instructions are executed by one or more electronic processors or co-processors, the processors or co-processors (or a device of which they are part) perform a set of operations that implement an embodiment of the disclosed method or methods.

In some embodiments, the systems and methods disclosed and/or described herein may be provided as services through a SaaS or multi-tenant platform. The platform provides access to multiple entities, each with a separate account and associated data storage. Each account may correspond to a user, a set or category of users, an entity, a set or category of entities, a set or category of data, a specific set of documents, a specific source of data to be processed (such as an interactive voice response system or customer service chatbot), an industry, or an organization, for example. Each account may access one or more services, a set of which are instantiated in their account, and which implement one or more of the methods or functions disclosed and/or described herein.

Other objects and advantages of the systems, apparatuses, and methods disclosed and/or described herein may be apparent to one of ordinary skill in the art upon review of the detailed description and the included figures. Throughout the drawings, identical reference characters and descriptions indicate similar, but not necessarily identical, elements. While the embodiments disclosed or described herein are susceptible to various modifications and alternative forms, specific embodiments are shown by way of example in the drawings and are described in detail herein. However, embodiments of the disclosure are not limited to the exemplary or specific forms described. Rather, the present disclosure covers all modifications, equivalents, and alternatives falling within the scope of the appended claims.

BRIEF DESCRIPTION OF THE DRAWINGS

Embodiments of the disclosure are described with reference to the drawings, in which.

DETAILED DESCRIPTION

Figure 1:
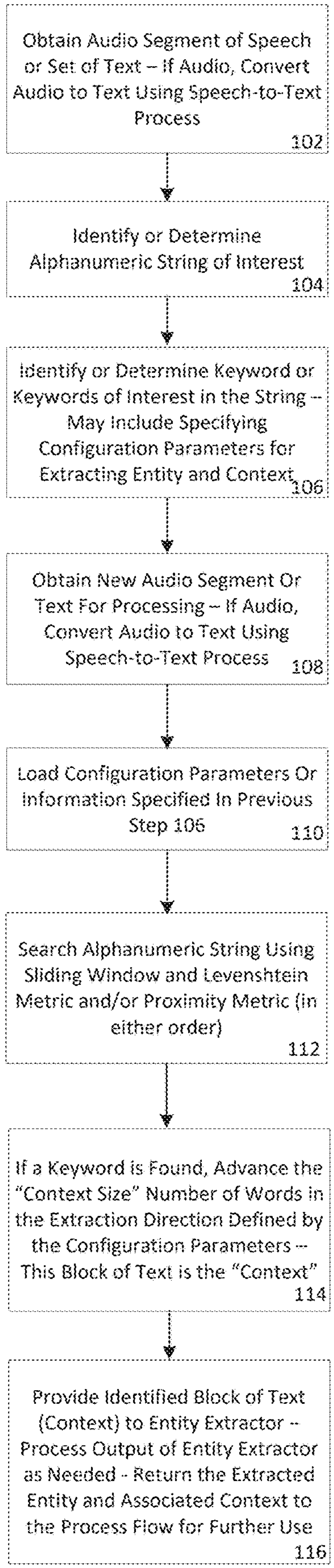
FIG. 1 is a flowchart or flow diagram illustrating a method, process, or set of steps, stages, functions, or operations for enabling a general-purpose entity extractor to be adapted for use with contextual information such as a domain specific field without additional retraining, in accordance with some embodiments.

One or more embodiments of the disclosed subject matter are described herein with specificity to meet statutory requirements, but this description does not limit the scope of the claims. The claimed subject matter may be embodied in other ways, may include different elements or steps, and may be used in conjunction with other existing or later developed technologies. The description should not be interpreted as implying any required order or arrangement among or between various steps or elements except when the order of individual steps or arrangement of elements is explicitly noted as being required.

Embodiments of the disclosed subject matter are described more fully herein with reference to the accompanying drawings, which show by way of illustration, example embodiments by which the disclosed systems, apparatuses, and methods may be practiced. However, the disclosure may be embodied in different forms and should not be construed as limited to the embodiments set forth herein; rather, these embodiments are provided so that this disclosure will satisfy the statutory requirements and convey the scope of the disclosure to those skilled in the art.

Among other forms, the subject matter of the disclosure may be embodied in whole or in part as a system, as one or more methods, or as one or more devices. Embodiments may take the form of a hardware implemented embodiment, a software implemented embodiment, or an embodiment combining software and hardware aspects. For example, in some embodiments, one or more of the operations, functions, processes, or methods disclosed and/or described herein may be implemented by a suitable processing element or elements (such as a processor, microprocessor, CPU, GPU, TPU, QPU, state machine, or controller, as non-limiting examples) that are part of a client device, server, network element, remote platform (such as a SaaS platform), an "in the cloud" service, or other form of computing or data processing system, device, or platform.

The processing element or elements may be programmed with a set of computer-executable instructions (e.g., software instructions), where the instructions may be stored on (or in) one or more suitable non-transitory data storage elements. In some embodiments, the set of instructions may be conveyed to a user over a network (e.g., the Internet) through a transfer of instructions or an application that executes a set of instructions.

In some embodiments, the systems and methods disclosed and/or described herein may be used to provide services through a SaaS or multi-tenant platform. The platform provides access to multiple entities, each with a separate account and associated data storage. Each account may correspond to a user, a set or category of users, an entity, a set or category of entities, a set or category of data, a specific set of documents, a specific source of data to be processed (such as an interactive voice response system or customer service chatbot), an industry, or an organization, for example. Each account may access one or more services, a set of which are instantiated in their account, and which implement one or more of the methods or functions disclosed and/or described herein.

In some embodiments, one or more of the operations, functions, processes, or methods disclosed and/or described herein may be implemented by a specialized form of hardware, such as a programmable gate array, application specific integrated circuit (ASIC), or the like. Note that an embodiment may be implemented in the form of an application, a sub-routine that is part of a larger application, a "plug-in", an extension to the functionality of a data processing system or platform, or other suitable form. The following detailed description is therefore not to be taken in a limiting sense.

An important benefit of one or more embodiments is to assist in understanding and more effectively responding to a portion of a conversation. This can be part of assisting a customer or user to receive a requested service or other form of assistance. One reason for the value of one or more embodiments is that effective communication is often based on understanding both the meaning (either literal or figurative) of a set of words and the context in which those words arose. This may include consideration of one or more entities, a relationship between an entity and other words in the set of words, and the overall intent of the set of words (as non-limiting examples).

For example, given the phrase "I want a large pizza", one could model this phrase as having the intention of requesting food, with the entities large and pizza. One could train a model to respond by either requesting a size for the pizza (if none is found) or continuing to checkout if a size is found in the phrase.

In some cases, it is possible to determine what information may be needed to complete a task and use that knowledge to construct a responsive question or identify a keyword. As an example, if a task involves determining information about an insurance claim, in advance it is known that there are several potentially relevant items of information. These might include the date of submission, date of processing, and date of payment for a claim. In this example case, given a statement from an IVR system such as "the claim as received on August $1^{st}$, processed on August $9^{th}$, and paid", an embodiment would recognize that the date of payment was missing and might be programmed to respond with a question designed to obtain the needed information, such as "what date was the claim paid". This is but one example of using knowledge regarding the subject of a query to "configure" an embodiment to operate to obtain the needed information by previously identifying entities, intents, and/or relationships (in this example, a specific date).

These approaches can be expanded to other examples within a conversation. Suppose there is a phrase "I want a red car, a blue bike, and a skateboard". In this situation, an entity extractor trained to look for colors would extract red and blue, and with an embodiment of the disclosure, be able to assign those colors to the car and bike. However, since the processing did not find a color for the skateboard, a system may conditionally respond by asking if there is a desired color for the skateboard. This processing flow could be implemented by requiring a color be associated with each item available in an online store before checkout. If the processing did not identify a color associated with an item, then the customer would be asked the color desired for the item before proceeding to checkout.

Prior to disclosing and/or describing an embodiment or embodiments of the disclosure, a more detailed example of the disadvantages of conventional approaches is described in the following. Assume a system is reading/parsing a paragraph, John's birthday is Aug. 24, 2020 and Adam's birthday is Jul. 28, 1974. Today's date is Mar. 29, 2023. AWS Comprehend (or a similar process or system) would extract information from the text in the form:

DATE→Aug. 24, 2020
DATE→Jul. 28, 1974
DATE→Mar. 29, 2023

The extracted information would include where the information was found, for example its numerical position in a paragraph. However, as is apparent, with AWS Comprehend or other form of conventional entity extractor, one would have no way of knowing which person's birthday was associated with which date. Furthermore, one couldn't be sure that the date corresponded to a birthday due to the lack of sufficient contextual information.

Embodiments are directed to a method for enabling a general-purpose entity extractor, such as AWS Comprehend, to be adapted for use with contextual information such as a domain specific field and to be able to do so without additional retraining. This enables a user to extract data and associate it with a label, field name, or other indicator of context or meaning. The association of the extracted data to the indicator of context or meaning may assist in the processing of a conversation, navigation of conversation, interpretation of a field value, or another similar task.

As another non-limiting example use case, it is noted that an organization may regularly have to deal with unstructured text. In this situation, a goal may be to provide structure to that text to assist in understanding or using it. For example, assume one works with call centers that deal with a specific domain. There are pieces of information that must be discussed during a call that are relevant to that domain and to providing a suitable response to a user.

Here, an embodiment of the disclosed and/or described approach may be used in a scenario where there is text, either from transcribed audio or originating in written form, to provide a degree of usable structure. In general, an embodiment can be used to provide structured information derived from a published paper or article, a chatbot conversation, an email, a transcription of a phone call, a podcast, or a speech, as non-limiting examples.

In the context of this disclosure, the following terms have at least the indicated meaning:

- Call: A telecommunication event between two or more parties;
- Character: A single letter, digit, or symbol that is part of a word or an identifier (ID);
- Keywords: A word or group of words that make up a pattern of language;
- Context: One or more words near or around a keyword or phrase and that assist in understanding the meaning or significance of a keyword, keywords, or phrase;
- Entity: An item of data to be extracted from a set of text. An entity can be almost any type of data, including but not limited to, Date, Money, Quantity, Time, Location, Organization, or an ID (such as an Alpha Numeric Sequence). In some cases, an entity will have a foreseeable structure or relevance;
- Window: A set number of words to consider for processing or interpretation;
- Sliding Window: An action of moving the window across words—each time the window is shifted it makes room for the newest word by deleting the oldest previously contained word;
- Configuration: A parameter or parameters that can be set outside of a process and passed into the system, and that operate to control a part of the process flow.

In the context of this disclosure, an "entity extractor" refers at least to a general-purpose trained Machine Learning or Deep Learning model (or other form such as REGEX) used to locate and extract an entity from a set of text.

In the context of this disclosure, "disambiguation" refers at least to an ability to determine a specific entity that is associated with a context or other information in a phrase or set of text when the phrase or text includes multiple possible entities and/or contexts. For example, in the case of text such as "My birthday is Aug. 1, 2000, and his birthday is Dec. 12, 1999", disambiguation would refer to the ability to tell that it was my birthday (August 1st) and not the December date.

In the context of this disclosure, a "configuration" refers to at least one or more parameters that are set (typically by a user or external process) and that are used to control the operation of a disclosed process or sub-process, including but not limited to a Levenshtein metric, Proximity search dimension, a processing or evaluation direction, or an entity type.

Embodiments utilize one or both of two approaches (i.e., Levenshtein metric and Proximity search) to identify and extract keywords. The following describes how an example set of keywords are handled by each of the two search approaches.

Herein the terms mentioned with reference to the Levenshtein metric have the indicated meanings:

- Levenshtein metric—a way of calculating a Levenshtein distance, where the "distance" is a measure of the closeness or difference between two strings of characters, and may be determined using a combination of one or more of operations:
  - Insertion: Adding a character to string A;
  - Deletion: Removing a character from string A;
  - Replacement: Replacing a character in string A with another character;
- The Levenshtein distance between two words is the minimum number of single-character edits (insertions, deletions or substitutions) required to change one word into the other (from Wikipedia);
- The Levenshtein metric is a way to represent the similarity between two given strings. As used in an embodiment of the disclosure, applying the metric results in a value that represents the result of a comparison between one or more keywords and a window of text in the input;
- This derived or calculated value can then be compared to a configurable value (referred to as a threshold value) to decide if the text being compared to a keyword or keywords is sufficiently close to the keyword or keywords to continue with the processing disclosed and/or described herein;
  - if the value equals or exceeds the threshold value, then the two strings are determined to be sufficiently close or similar for the process flow continue;
  - if the value falls below the threshold value, then the process moves the evaluation window and continues by determining a new value for the Levenshtein distance.

As discussed in greater detail herein and by way of examples, each of the two approaches, proximity and Levenshtein distance have advantages in certain situations. Levenshtein distance is useful in overcoming errors in transcribing an audio segment, while proximity search is useful in a situation where a transcription includes random noise, blips, or background speech. Depending upon the order in which they are applied, both may be needed to properly identify the contents and meaning of a phrase or sentence.

With regards to using Levenshtein distance as a basis for a search, if a keyword phrase has four words in it, the process slides a moving window of length four words across the entire input text (where the input text is from a form, field, transcription, or other source). In one use case, the input text may be thought of as an entire transcript; however, the disclosed and/or described approach may be applied to a block of text, a sentence, a paragraph, an essay, an entire document, or a call transcript, as non-limiting examples.

Each time the sliding window is applied, the Levenshtein distance is determined to compare the keyword phrase (containing a set of one or more keywords) to the current phrase contained in the sliding window. If the similarity score according to Levenshtein distance is above a configurable threshold, then the process determines that the desired phrase has been located and returns the location of the keyword phrase in the text.

When performing a proximity search, the process searches for a single keyword from a keyword phrase. If the process finds one or more of the keywords, it then searches for the rest of the words in the keyword phrase. A constraint is that all of the keywords that make up the keyword phrase be found within a configurable distance of each other. For example, if the keywords are "date of service" with a configurable distance of five and the process finds the phrase, "date of ok yes service is", it would conclude that it found the desired keywords, because each of the words in the keyword phrase are within five words of each other.

FIG. 1 is a flowchart or flow diagram illustrating a method, process, or set of steps, stages, functions, or operations for enabling a general-purpose entity extractor to be adapted for use with contextual information such as a domain specific field without additional retraining, in accordance with some embodiments.

In one embodiment, steps 102, 104, and 106 may be considered as part of a "training" or similar initialization process to determine the desired configuration parameters for the entity and context extraction and interpretation process flow that will be applied to a conversation or set of text[3] after determination of the configuration parameters. In one embodiment, the configuration parameters may be obtained by another mechanism and stored for later retrieval and use in the processing of a set of text.

[3]For setting configuration parameters, an example of this process may be expressed as:

- Examine the text in question for which one wants to contextualize the entities;
- Determine one or more relevant keywords and/or other parameters;
- Test on the text, tune, and if needed, adjust parameters ahead of deployment to assess how effectively the configured process determines the entities and corresponding contexts.

As an example, for the domain of assisting users to navigate an IVR system used by a medical insurance company, a provider of an embodiment of the disclosure may perform linguistic research on additional insurers. This may include looking at transcripts from conversations with those insurers and identifying a set of keywords that can be used to contextualize entities. Those "configurations" can then be added to an embodiment to consider when processing a segment of a conversation or exchange of information.

In one embodiment, steps 102, 104, and 106 may be used to prepare a system to detect an event, such as the occurrence of a specific category of action(s) or type of information. In yet another embodiment, those steps may be part of a process used to label a data set for use in developing a trained model. In general, determining a set of configuration parameters for the entity and context extraction may be an iterative process that tests and evaluates multiple sets or values for the configuration parameters.

For example, in some embodiments, the configuration parameters may be set to initial values and then altered as input text (which may be obtained after processing of an audio sample) is processed to produce more accurate results. In some embodiments, a set of configuration parameters may be suggested from previous experience with text obtained from a specific source, and then refined during processing of a more recent set of text. In some embodiments, a set of parameters may be generated from processing of a set of text and confirmed by a user, and then applied to subsequently received text during the same or a different session.

As shown in the figure, in one embodiment, a method, process, or set of steps, stages, functions, or operations may include the following where, as described herein, in some situations, one or more of the initial steps or stages (such as 102, 104, and 106) may be used to construct or define a set of configuration parameters that are stored and later retrieved as part of processing a received call or text:

- Obtain one or more audio segments of speech (from a call received at a call center, as an example) or a set of text (from a chatbot conversation, text message, or email, as examples) (as suggested by step or stage 102);
  - If applicable, convert the audio segment to text using a speech-to-text conversion process;
    - The audio segment can be a single sentence, a paragraph, a multi-turn conversation, a book, or a body of text, as non-limiting examples. The original source can be audio, which is then transcribed, but can also have text as its root source (such as emails, or text conversations, as non-limiting examples);
  - If a segment of a conversation is already in text form (such as from a chatbot or email), then speech-to-text conversion is not needed;
- Determine an alphanumeric string of interest (such as one including an entity and/or an indication of context) (as suggested by step or stage 104);
  - As a non-limiting example, this might be a field label or identifier (such as, but not limited to (or required to include) date of birth, date of service, an identifier, or a service code);
- Determine a keyword or keywords of interest in the alphanumeric string (as suggested by step or stage 106);
  - This may be part of an iterative process that specifies one or more keywords at a time until all possible keywords of interest in the string are identified/located;
    - The keyword or words may be those typically associated with the information or data sought to be identified and extracted (such as, but not limited to a label, a category, a word or phrase commonly used to preface an item or data of significance);
    - Note that a keyword or keywords may represent one or both of a string describing a context and/or a value for that context;
      - If one said, "My birthday is Aug. 23, 1999" the keywords could be something such as "My birthday is". The context is typically important, as the process is attempting to establish what the text is related to or about;
      - As non-limiting examples, the "context" may be contained in a phrase of the form:
        - My birthday is;
        - The claim was received on;
        - The watch cost;
        - I have in my bank account;
  - In one example embodiment, identifying and/or locating the keyword or keywords of interest in the string may include one or more of the following steps, stages, operations, functions, or processes:
    - Given a set of training data or a domain of text, determine what content or aspects to extract;
      - This might be a field value or text under a specific heading, as non-limiting examples;
    - Create a "configuration" to extract the contextualized entities (where a contextualized entity is a result of taking an entity and connecting it to or associating it with a context) by setting or specifying one or more of the following process parameters or information:
      - Levenshtein threshold;
      - Proximity distance;
      - Extraction direction (forward, backward, or both forward and backward);
      - Context size (expressed as a number of words); and
      - Entity Type or Type (such as MONEY, DATE, ID, Location, or Organization, as non-limiting examples);
        - This information can sometimes be used to cause one or more of the mentioned steps or stages to ignore one or more entities that are not of interest, and/or to "focus" on an entity that is of greatest interest;

For a new audio segment or text/data being processed within a "window", if the source is text use text, if the source is audio convert it to text using a speech-to-text conversion process (as suggested by step or stage 108);

The disclosed and/or described processing steps or stages may be applied to an audio or text stream and does not have to be applied after an audio or text segment is completed—this allows (for example) processing of an incoming call to a call center while the call is occurring;

Load (e.g., access or retrieve) the configuration information specified in step 106 (the set of parameters and/or information associated with an extraction process) (as suggested by step or stage 110);

Perform a search over the alphanumeric string (such as text) using a sliding window (as suggested by step or stage 112);

Within the text or alphanumeric string found in a current position of the sliding window apply the Levenshtein metric and/or Proximity search approach in either order (with the order possibly determined by knowledge regarding content of the text being processed);

As mentioned, the order of use of the Levenshtein or proximity search approach may not matter, and in some cases, both approaches may be needed. Using a Levenshtein score (which may then be compared to a threshold value) is better for a sample containing transcription errors, while using the proximity search is better for handling interjections in a conversation, so a review of a transcript may suggest which search technique to apply first;

In general, the two search techniques may be performed in either order, with the first technique applied being based on knowledge regarding the expected characteristics or source of the text being processed. If a keyword or keywords are found using the first technique applied, then it may not be necessary to apply the second technique;

If the keyword(s) are found in the window, go to (i.e., find and identify) the "context size" number of words in the direction established by the extraction direction in the configuration parameters (as suggested by step or stage 114);

This new "block" of text (i.e., the context size number of words) is the "context" for purposes of applying the disclosed approach;

As an example, the context is a set of one or more words in a string that are offset a specified amount from a keyword or keywords;

Provide Identified Block of Text (Context) to Entity Extractor-Process Output of Entity Extractor as Needed-Return the Extracted Entity and Associated Context to the Process Flow for Further Use (as suggested by step or stage 116);

If a single entity is found matching the type established in the configuration parameter(s), then conclude that the process found the entity to "match" to the field in question;

If there are no entities matching the type in the configuration parameter(s), then continue searching using the sliding window;

If there are multiple entries matching the type in the configuration parameter(s), then filter (reduce) down to the entity closest to the keywords;

Closeness may relate to the configurable direction parameter. If the direction selected is both forward and backwards, then closest is impacted by words both before and after a keyword;

Exact ties are edge cases, but theoretically could happen. In these situations, the system may default to using the entity in front of a keyword;

If there are multiple entities matching the type in the configuration parameter(s), then the entity that is closest to the keyword(s) location is determined to be the entity desired;

In response to identifying/determining a keyword or keyword and its context in a segment of text, perform an indicated operation or function, where this will typically depend upon the specific keyword(s) and context;

The indicated operation or function will typically depend upon the entity, the context, and in some cases the value of the entity;

In some situations, the operation or function may be determined by application of a heuristic, set of rules, or trained model that takes into consideration one or more of the entity, the context, and in some cases the value of the entity;

In one embodiment, the system may take an extracted entity that has been contextualized and structure it; i.e., write the entity with the value it represents to a database, or store it as a JSON object;

A structured object may then be subjected to display as part of a UI or field, stored and used as part of a downstream process or logic, or used to determine how to respond to a question or segment of a conversation.

As further non-limiting examples, in response to determining one or more keywords and their associated contexts (i.e., a meaning or interpretation), an embodiment may enable one or more of the following processes, decisions, or events:

Causing a routing (or change in routing) of a request or statement, such as to an appropriate customer service representative, chatbot, source of information, or process flow;

Adjusting/modifying one or more follow-up questions based on the information provided (in this example, the process flow assists in determining/deciding a next round or phase of a conversation or interaction). As non-limiting examples;

When checking out at a store and selecting details about what one wants purchase. This might involve processing an audio conversation; or When ordering food online using voice-based technology. One would need to ask the correct follow up questions based on an ordered item to ensure the customer received everything they wanted or needed with a meal;

Extracting information for a downstream data science or IT task. As examples;

Contextualizing information about an insurance claim. For example, is the dollar value a member responsibility or an insurance paid amount? Subsequently, deciding if a provider should bill a patient may be based on an entity extraction;

Extracting information from conversations about a domain and developing insights into one or more entities based on a larger amount of data; or Operating as a scheduling assistant by contextualizing times in a text-based conversation and automatically adding them to a calendar;

As an example, receiving a text message that says, let's get dinner at 7 and then see that movie at 9:30. A user would want to see an indication of 7 μm Dinner, 9:30 μm Movie. This data could be extracted in its appropriate context and then provided to a scheduling application within a smart device.

For use of the Levenshtein metric, the process slides a moving window over the text. The sliding window size is preferably set equal to the keyword or keywords length. As the keyword window slides, the process compares the Levenshtein score (or value) of the words inside the window against the keywords. If it is a "match", then the process returns "True"; if not, the process slides the window over a next word. Note that one could also implement an embodiment that slides/moves based on character length (i.e., a number of characters).

For the proximity search approach, search the text for a keyword in the keyword(s) of the configuration data. Once a first keyword is found, look for the other keyword or keywords within the bounds set by the proximity distance parameter set in the configuration data. If those are found, return "True"; if not, move to the next occurrence of a keyword.

Note that the methods (Levenshtein and Proximity) disclosed herein to identify keywords are not necessary to use together, although they often may both be needed to provide sufficient clarity or accuracy. The Levenshtein approach has the strength of being largely insensitive to errors generated by a transcription process. For example, consider the two strings:

1. "the claims have been received";
2. "the claim has been received".

These differences may occur using a transcription service; however, use of the Levenshtein metric would say these are roughly 83% similar (where in one embodiment, the threshold for finding keywords is set at approximately 75%).

On the other hand, the disclosed Proximity approach is more appropriate for ignoring interjections in a conversation. For example, consider an example conversation as follows.

Speaker 1: what is your (interruption by speaker 2) birthday? In this situation, the actual string the system encounters is ("What is your Yes go ahead, Birthday). In this case, if the keywords are "your birthday" and the configurable distance is set to 4, since the process would find the words "your" and "birthday" within 4 words of each other, the approach would conclude that it found a match.

Proximity search is a useful technique because the disclosed approach is largely insensitive to interruptions and interjections, which may occur often in a real conversation. As disclosed and/or described herein, embodiments allow use of one or both search approaches depending upon the situation or context.

A more detailed example of the context and disambiguation challenge addressed by embodiments of the disclosure is the following:

Assume there is data in a set of text (e.g., derived from an audio source) that contains one or more entities of interest. At this stage, a user needs to determine what contextualized entities (i.e., an entity and its relevant context) to extract;

For example, one may have a record of a conversation or conversations between realtors and prospective property buyers, where they talk about the cost of a property and discuss a prospective buyer's budget. If originally in the form of audio, the conversation has been converted into text, and it is decided that it would be helpful to disambiguate between property cost and a buyer's budget. With this ability, one could answer questions such as, "of all the conversations across all realty agents in our organization, how many had a buyer whose budget was greater than the property they wanted";

To accomplish this, one might decide to extract two entities, "buyer budget" and "property cost". A user would then determine one or more keywords for each of those entities:

As an example of the possible configuration parameters and keywords: For Buyer Budget keywords=my budget is
Levenshtein=0.9
Proximity=4
direction=forward
context size=3
entity type=Money For Property Cost keywords=the house costs, that property costs (notice that one can have multiple sets of keywords).
Levenshtein=0.9
Proximity=4
direction=forward
context size=5
entity type=Money Now assume the text being processed is the following:

Speaker 1—I'd love to purchase a house from you. I'm looking for something in San Diego, my budget is 500 k. Can we work with that?

Speaker 2—Great, thanks! I would love to help you find a house. I have a great property for you, with a budget of 500 k we can find a nice apartment. I have a property that costs 550 k? Can your budget come up?

In this situation and based on the configured parameters, the disclosed approach would generate the following contexts:

Context1=my budget is 500 k. Can we;

Context2=property that costs 550 k? Can your budget come up?

Here, one would send each context to an entity extractor. The entity extractor would return the following:

In context 1—Money=500 k, found at position (X);

In context 3—Money=550 k, found at position (Y);

From here we can say Budget=500 k, Property Cost=550 k

With regards to the above example, suppose a real estate brokerage wanted to do an analysis on how often peoples' budgets are requested to come up by realtors and how often that occurs, as well as by how much. An embodiment could take those two values, buyer budget and property cost and log them into a database. After processing multiple conversations, that database could be accessed and used to better understand how to deal with a buyer's initial budget and set their expectations accordingly.

In one embodiment, the configurable distance value may be set based on the domain and/or a priori knowledge. For example, if one is setting a configurable distance for a monologue, then this number can be set tighter (or lower).

In this case, even if a speaker pauses or stumbles over a keyword, the disclosed approach will be unaffected if the length of the stumble is less than the distance configuration. However, in a multi-party conversation, one may want to set the configuration value to be larger, that is the distance may be set greater to better protect against long interruptions. However, increasing the value comes at the risk of finding incorrect keyword locations.

Once a keyword or keywords are found, the process returns the location of the keywords or keyword phrase. In one embodiment, the process flow may combine the two approaches or search algorithms by first searching using Levenshtein distance, and then subsequently using proximity search if the first search approach fails to find highly related matches using Levenshtein distance as a metric.

In the operation of a system, apparatus, or platform implementing the two approaches, this allows the use of one or both approaches and the associated search algorithms. This is useful in addressing a wider range of cases, such as where a keyword may be more difficult to identify. This is at least partly because use of Levenshtein distance is better at finding exact or almost exact matches as well as errors in transcribed text, while proximity search is tolerant to interjections. For example, a superfluous word within a keyword phrase would confuse a use of Levenshtein distance but would not impact proximity search. This pairing of approaches makes the disclosed system robust, highly reliable, and tolerant to both different ways of stating something, and to transcription variability which can introduce errors or ambiguities.

Once either algorithm locates a keyword or keywords in a text segment (either generated from an audio segment or originally in text form), the process then identifies text that is assumed to represent or assist in determining the context or meaning of the keyword or keywords. In one embodiment, this is done by using a configurable context size (a form of offset) and direction that are specified as configuration parameters.

Based on the returned location of a keyword (obtained using either algorithm), the process is capable of generating three different possible contexts. A configurable direction of "forward" means that the process takes the location of the found keyword and looks a configurable distance ahead, where distance is understood as the number of words to look ahead from a current word. A direction of "both" means that the process takes the location of the found keyword and looks a configurable distance both before and after the keyword. Similarly, a direction of "backwards" looks only the configurable amount prior to the keyword(s).

In some embodiments, not only is the configurable distance (also referred to as the context size, i.e., how far away an entity or identifier associated with context is expected to be from a keyword) domain specific, but so is the configurable direction. This suggests use of a domain expert or someone at least familiar with the domain and the representation of information in that domain when setting one or more of the configurable parameters.

In some cases, after application of the context size, the result may contain more than a single entity. In this situation, a disambiguation distance may be applied, where the process chooses the entity that is closest in distance (i.e., the minimum number of words or characters) from the keyword or keywords.

An operational aspect that is related to the value of one or more of the configurable parameters is the implementation cost. For example, entity extraction is priced at a cost per word sent to an extraction platform or service. This means the cost is directly related to the context size as that impacts how many words would need to be processed by an entity extractor or other processing technique. The configurable direction may also be a consideration in the cost of entity extraction. For example, one may find that the entity exists before the keywords themselves. As odd as this may sound, it is regularly experienced in some domains. For example, a phrase might be "We found $1,456 as the total amount billed". In this situation, one would need to tell the system that the $1,456 is related to the words "Billed Amount".

In summary, while scenarios are potentially domain specific, a benefit of the disclosed and/or described approach is its ability to adapt to almost any domain it may encounter via the configuration of a distance, a direction, and the specific distance or search approach (or approaches) used.

Based on the disclosed and/or described process flow, one is able to define bounds for the beginning and ending locations of the context. The process selects the words between the bounds and sets this as the current context. This block of text will either have the keyword(s) or phrase at the beginning, middle, or end of the block. This newly formed block of text is input into an entity extractor, such as AWS Comprehend. The extractor returns (outputs) a list of entities found in the block of text built around the specified keywords.

At this stage, the process matches the type of data being sought with the type of data generated by the entity extractor. For example, if one is looking for a birthday, then one would only consider dates returned by the entity extractor. One can also use additional criteria to further filter the entities returned by the extractor (e.g., by using a confidence level or value).

In some cases, even after performing further filtering, there may be multiple candidate entities that are identified and need to be related to the keywords. In that situation, one can disambiguate based on distance. For example, calculate the number of characters from the keywords to each candidate entity, and select the entity that is closest in distance to the keyword or keywords.

In one embodiment, a confidence level, metric, or similar value may be used depending on the domain. For example, one may decide it is preferable to not extract something rather than extract something that is incorrect. A configurable confidence value may be output by AWS Comprehend, as an example, and then subjected to a filter or thresholding operation as part of determining whether to extract an entity and associate it with a keyword or keywords.

Another feature that may be used is termed 'WithinKeywords". This is a Boolean operator or function that may be applied (as an example) if one expects the entity to exist within the keywords themselves. For example, consider the phrase "We billed $123 to the patient". The word "billed" may exist somewhere else as well as the word "patient". The true keywords are "billed to the patient". In this case, one doesn't need to create a context description with a size and direction; instead, the system needs to be informed that it should look within the keywords themselves to find the entity. One would preferably use a proximity search technique in this example to reduce the "cost" in searching for the keywords. Other forms or types of operators may also (or instead) be used.

As described previously, an audio input could be converted to text (i.e., transcribed) in real-time. Following the transcription, the text could be grouped into a set of categories, such as "intent" or characteristics of an order. The text could then be translated or converted to an embedding. Next, the embeddings and intents/labels can be used as the basis for training a machine learning model. The training would cause the model to "learn" the relationship between the embeddings and intent/label. Each embedding may be assumed to include an intent and an entity that the intent applies to. This could then be used to decide if additional information was needed and/or how best to respond to a user.[4]

[4]As a non-limiting example, take audio and in a live streaming fashion send that to a service API for transcription. That can be an off the shelf vendor such as AWS, Azure, Google, or something specially trained. This step takes received audio and converts it to text.

One could subsequently group pieces of text, such as phrases into "intents". This would provide labels for each group of phrases. Next one could translate that specific text into embeddings. This can be done by downloading a pre-trained model such as BERT, or a similar model. Consider a vector of 718 values between 0 and 1. This allows the embeddings to be similar in certain areas and different in others.

Next, one could train a Machine Learning (ML) model (e.g., Logistic Regression, Random Forest, Support Vector Machine, Decision Tree, Feed Forward Neural Network, or DIET). This ML would learn the relationship between the embeddings and the intent. As an example, for an order at a restaurant, one could define the intent as being a person wants to order something. The entity for what they are ordering is French fries (as an example).

However, in some cases, a customer may not provide all of the information needed to initiate an order. For example, the desired size may be missing. In this situation, a system may instead respond "What size do you want" or something to that effect. As shown in this example, contextualizing an entity can be used as a means to generate a better response.

As disclosed and/or described herein, a configuration (typically, a set of parameters that impact how the disclosed processing steps or stages will be executed) for processing a received audio segment of set of text may include the following parameters:

- Keyword(s)—one or more terms, words, characters, or phrases being searched for;
- Levenshtein distance—a value obtained by applying the Levenshtein metric to two sets of text, where if that value exceeds a specified threshold, then its is concluded that a desired keyword or phrase has been located;
- Proximity—a value that defines a number of characters from a location within which to search;
- Type—a field type or category being searched for (also referred to as entity type);
- Direction: a search direction or directions (backward, forward, or both).
- Context Size—(expressed as a number of words).

Additionally, in some embodiments, there are two other parameters that have been found to be of value:

- Normalization type;
- Normalization type tells the system how to normalize an entity. For example, if the extracted entity is of the form 400 $20 and 12 cents (where it looks like this because of transcription), the system may have been instructed to normalize this entity using a set of instructions that operate to turn the above into $420.12. Similarly, if an ID is transcribed as 128 A thirteen 27, then instructions may cause it to be normalized as 128A1327;
- Keywords2;
- Keywords2 may be used to instruct the system to skip the entity extraction processing. In this situation, parameters are set as keywords1=some text and keywords2=some other text. The system then naively extracts everything between the two sets of keywords. Here, the keywords may be found in the same way as disclosed and/or herein, that is via Levenshtein or proximity with a sliding window.

Figure 2:
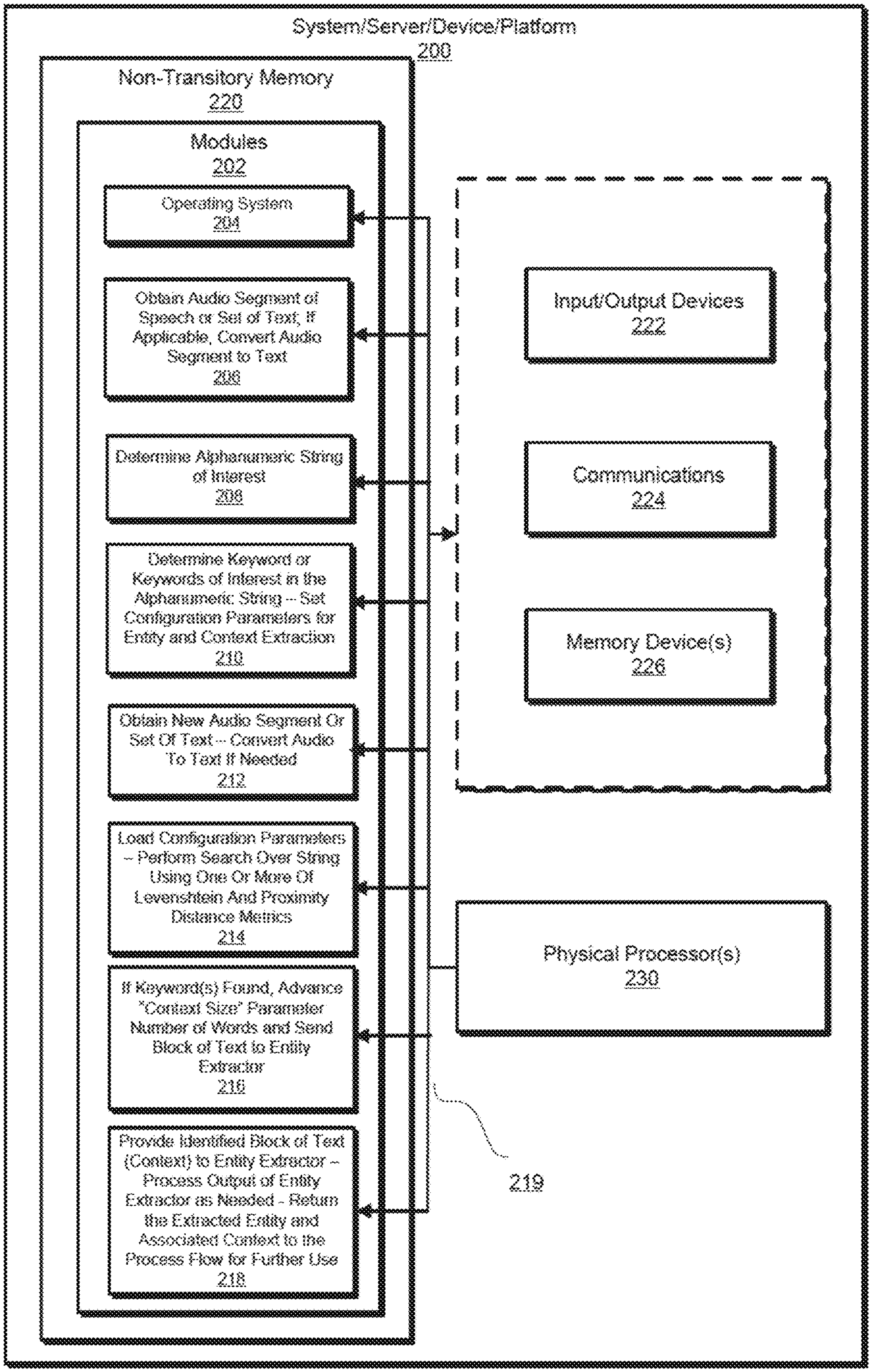
FIG. 2 is a diagram illustrating elements or components that may be present in a computing device, server, or system configured to implement a method, process, function, or operation in accordance with some embodiments.

FIG. 2 is a diagram illustrating elements, components, or processes that may be present in or executed by one or more of a computing device, server, platform, or system 200 configured to implement a method, process, function, or operation in accordance with some embodiments. In some embodiments, the disclosed and/or described system and methods may be implemented in the form of an apparatus or apparatuses (such as a server that is part of a system or platform, or a client device) that includes a processing element and a set of computer-executable instructions. The executable instructions may be part of a software application (or applications) and arranged into a software architecture.

In general, an embodiment may be implemented using a set of software instructions that are executed by a suitably programmed processing element (such as a GPU, CPU, TPU, QPU, microprocessor, processor, controller, state machine, or other computing device, as non-limiting examples). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by execution of the instructions contained in the module or sub-module. Such function, method, process, or operation may include those used to implement one or more aspects of the disclosed and/or described systems, apparatuses, and methods.

The modules and/or sub-modules may include a suitable computer-executable code or set of instructions, such as computer-executable code corresponding to a programming language. For example, programming language source code may be compiled into computer-executable code. Alternatively, or in addition, the programming language may be an interpreted programming language such as a scripting language.

A module or sub-module may contain instructions that are executed by a processor contained in more than one of a server, client device, network element, system, platform, or other component. Thus, in some embodiments, a plurality of electronic processors, with each being part of a separate device, server, platform, or system may be responsible for executing all or a portion of the software instructions contained in an illustrated module. Thus, although FIG. 2 illustrates a set of modules which taken together perform multiple functions or operations, these functions or operations may be performed by different devices or system elements, with certain of the modules (or instructions contained in those modules) being associated with and executed by those devices or system elements.

As shown in FIG. 2, system 200 may represent one or more of a server, client device, platform, or other form of computing or data processing device. Modules 202 each contain a set of computer-executable instructions, where when the set of instructions is executed by a suitable electronic processor (such as that indicated in the figure by "Physical Processor(s) 230"), system (or server, platform, or device) 200 operates to perform a specific process, operation, function, or method.

Modules 202 may contain one or more sets of executable instructions for performing a method or function described with reference to the Figures, and the disclosure and/or description of the functions and operations provided in the specification. These modules may include those illustrated but may also include a greater number or fewer number than those illustrated. Further, the modules and the set of computer-executable instructions that are contained in the modules may be executed (in whole or in part) by the same processor or by more than a single processor. If executed by more than a single processor, the other processors may be contained in different devices, for example a processor in a client device and a processor in a server.

Modules 202 are stored in a (non-transitory) memory 220, which typically includes an Operating System module 204 that contains instructions used (among other functions) to access and control the execution of the instructions contained in other modules. The modules 202 in memory 220 are accessed for purposes of transferring data by use of a "bus" or communications line 219, which also serves to permit processor(s) 230 to communicate with the modules for purposes of accessing and executing instructions. Bus or communications line 219 also permits processor(s) 230 to interact with other elements of system 200, such as input or output devices 222, communications elements 224 for exchanging data and information with devices external to system 200, and additional memory devices 226.

Each module or sub-module may correspond to a specific function, method, process, or operation that is implemented by execution of the instructions (in whole or in part) in the module or sub-module. Each module or sub-module may contain a set of computer-executable instructions that when executed by a programmed processor, processors, or co-processors cause the processor(s) or co-processors (or a device, devices, server, servers, platform, or platforms in which they are contained) to perform the specific function, method, process, or operation.

As mentioned, an apparatus in which a processor or co-processor is contained may be one or both of a client device or a remote server or platform. Therefore, a module or sub-module may contain instructions that are executed (in whole or in part) by the client device, the server or platform, or both.

Such function, method, process, or operation may include those used to implement one or more aspects of the disclosed and/or described system and methods, such as for (where as mentioned, in some situations, the processes implemented by execution of the instructions in modules 206, 208, and 210 may be used as part of a configuration process to "set" the parameters for the extraction and understanding of entities and related contextual information from text located in a processing "window", and may have been performed in advance of the current processing and stored as a set of retrievable configuration parameters):

- Obtain an Audio Segment of Speech or a Set of Text; If Applicable, Convert the Audio Segment to Text (as suggested by module 206);
- Determine an Alphanumeric String of Interest (module 208);
- Determine a Keyword or Keywords of Interest in the Alphanumeric String-Set the Relevant Configuration Parameters for Entity and Context Extraction (module 210);
- Obtain a New Audio segment or Set of Text-Convert the Audio to Text if Needed (module 212);
- Load (e.g., access or retrieve) the Configuration Parameters-Perform a Search Over a Text String Using One or More of Levenshtein and Proximity Distance Metrics (module 214);
  - In general, the two search techniques may be performed in either order, with the first technique applied being based on knowledge regarding the expected characteristics or source of the text being processed. If a keyword or keywords are found using the first technique applied, then it may not be necessary to apply the second technique;
- If Keyword(s) Found, Advance the "Context Size" Parameter Number of Words in the Specified Direction (s) and Send the Block of Text to an Entity Extractor (module 216);
- Provide Identified Block of Text (Context) to Entity Extractor-Process the Output of the Entity Extractor as Needed-Return the Extracted Entity and Associated Context to the Process Flow for Further Use (module 218);
  - This may include filtering, comparing a confidence level to a threshold value, or other suitable evaluation process;
  - Returning the extracted entity and associated context to the process flow for further use may include one or more of:
    - Causing a routing (or change in routing) of a request or statement, such as to an appropriate customer service representative, chatbot, source of information, or process flow;
    - Adjusting/modifying one or more follow-up questions based on the information provided (in this example, the process flow assists in determining/deciding a next round or phase of a conversation or interaction);
    - Extracting information for a downstream data science or IT task;
    - Operating as a scheduling assistant by contextualizing times in a text-based conversation and automatically adding them to a calendar.

In some embodiments, the functionality and services provided by the system, apparatuses, and methods disclosed and/or described herein may be made available to multiple users by accessing an account maintained by a server or service platform. Such a server or service platform may be termed a form of Software-as-a-Service (Saas).

Figure 3:
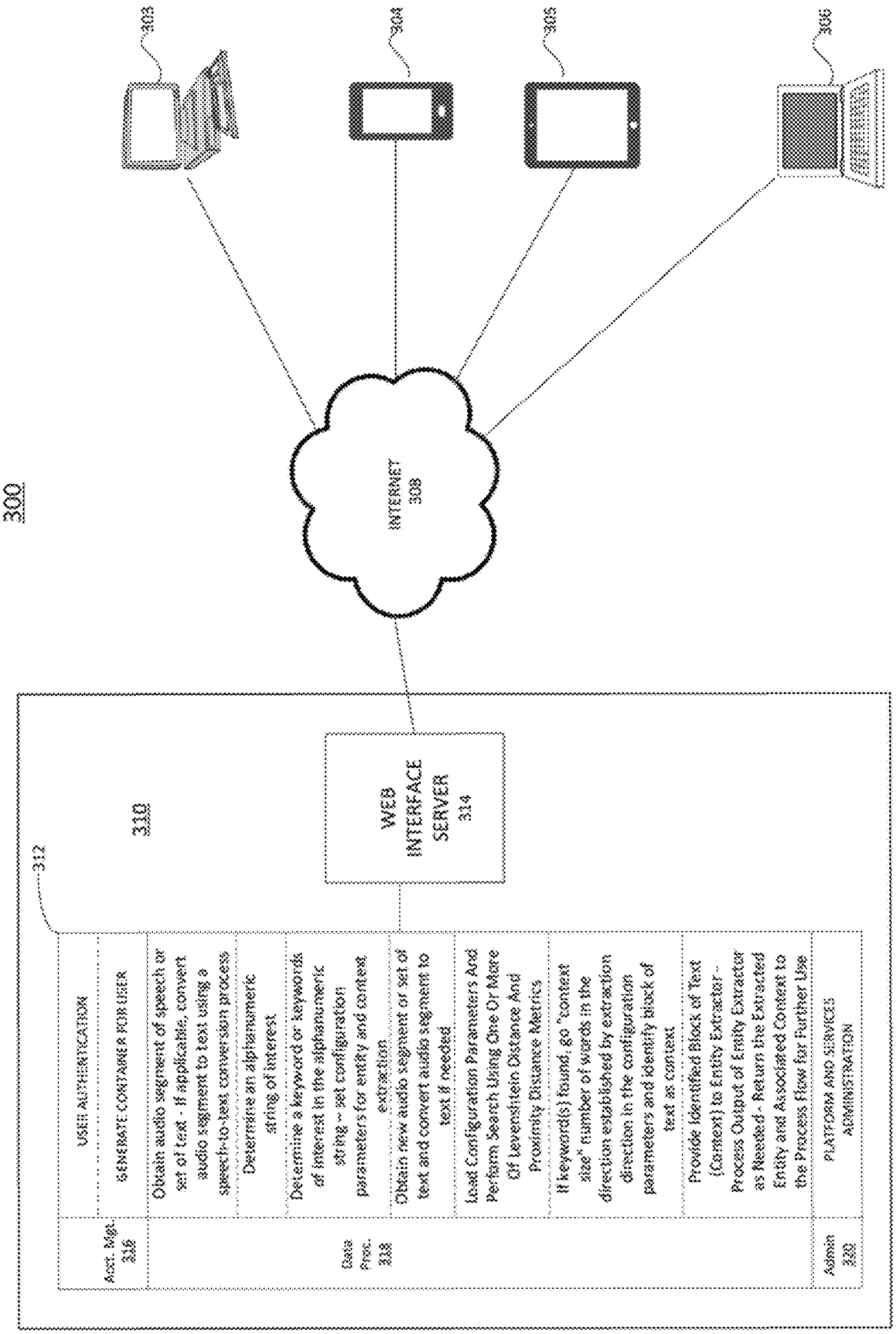
FIGS. 3, 4, and 5 are diagrams illustrating an architecture for a multi-tenant or SaaS platform that may be used in implementing an embodiment of the systems, apparatuses, and methods disclosed herein.
Figure 4:
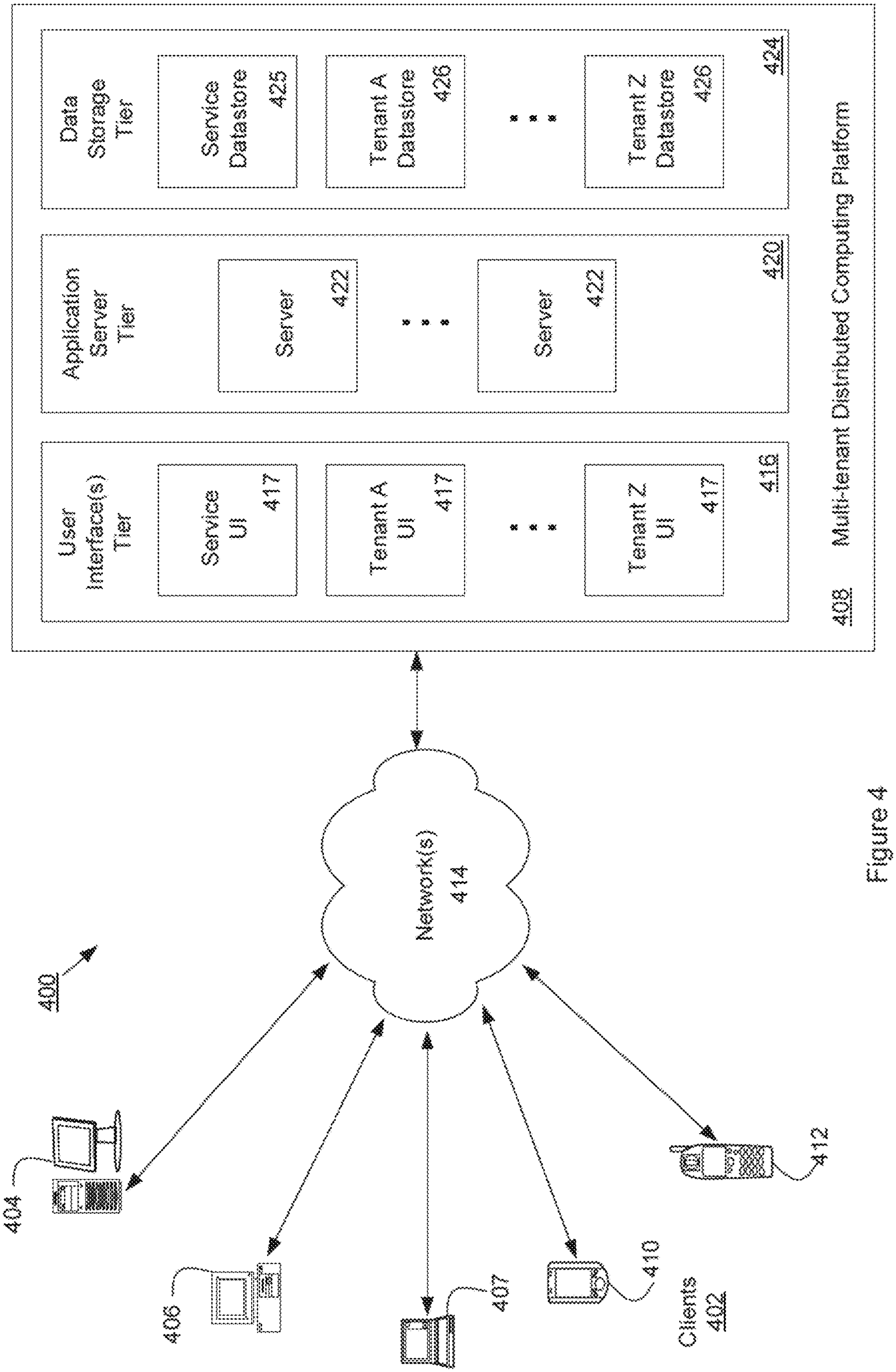
Figure 5:
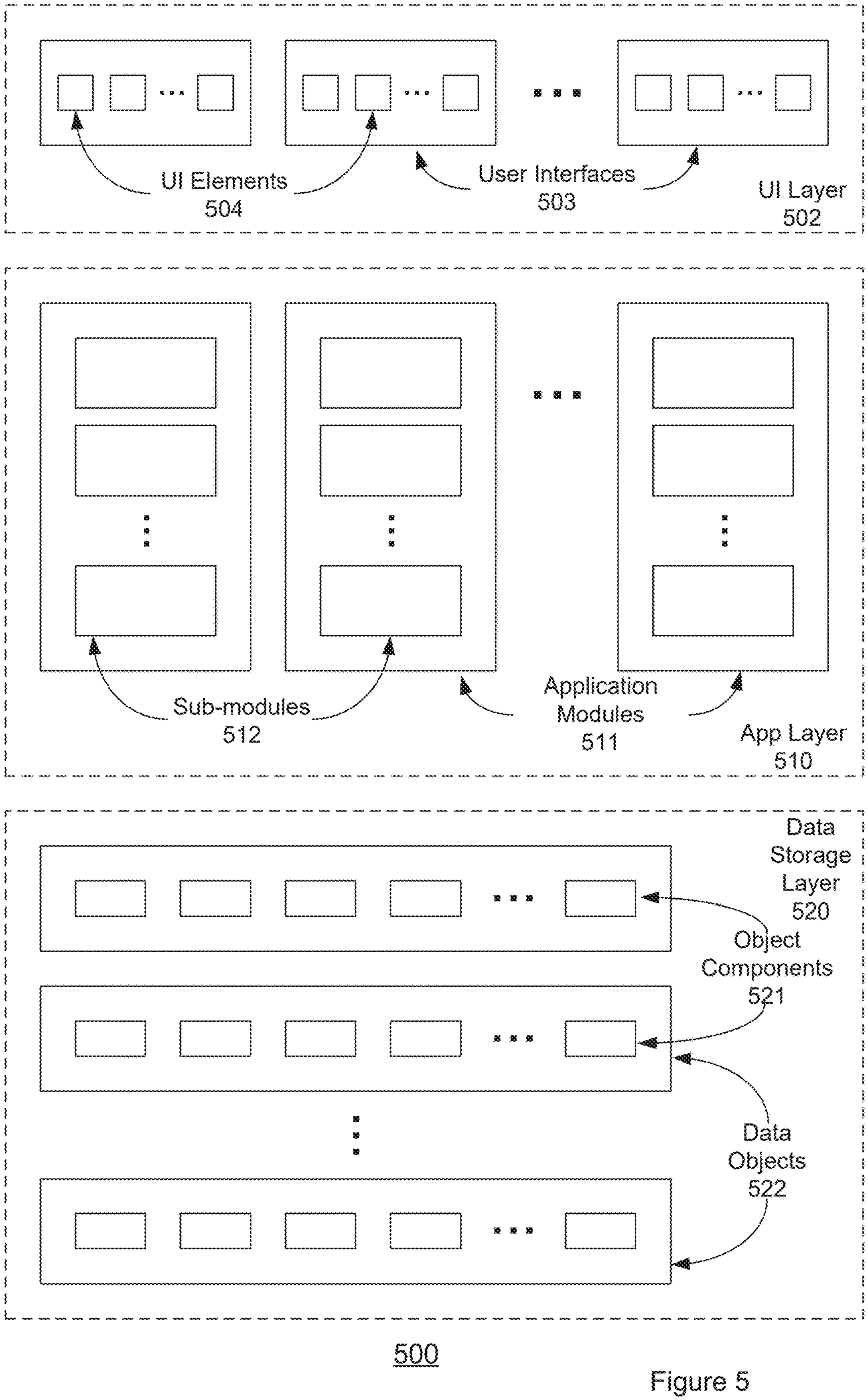

FIG. 3 is a diagram illustrating a SaaS or multi-tenant system or platform that may be used in implementing an embodiment of the systems, apparatuses, and methods disclosed and/or described herein. FIG. 4 is a diagram illustrating elements or components of an example operating environment with which an embodiment may be implemented. FIG. 5 is a diagram illustrating additional details of the elements or components of the multi-tenant distributed computing service platform of FIG. 4, with which an embodiment may be implemented.

In some embodiments, the system or services disclosed and/or described herein may be implemented as microservices, processes, workflows or functions performed in response to the submission of a set of input data or request. The microservices, processes, workflows or functions may be performed by a server, data processing element, platform, or system.

In some embodiments, the data analysis and other services may be provided by a service platform located "in the cloud". In such embodiments, the platform may be accessible through APIs and SDKs.

The functions, processes and capabilities disclosed and/or described herein (and in some cases, with reference to one or more of the Figures) may be provided as microservices within a platform. The interfaces to the microservices may be defined by REST and GraphQL endpoints. An administrative console may allow users or an administrator to securely access the underlying request and response data, manage accounts and access, and in some cases, modify the processing workflow or configuration.

Note that although FIGS. 3, 4, and 5 illustrate a multi-tenant or SaaS architecture that may be used for the delivery of business-related or other applications and services to multiple accounts/users, such an architecture may also be used to deliver other types of data processing services and provide access to other applications. For example, such an architecture may be used to provide one or more of the processes, functions, features, or operations disclosed and/or described herein.

In some embodiments, a platform or system of the type illustrated in the Figures and disclosed and/or described herein may be operated by an entity that provides a specific set of services or applications. In other embodiments, the platform may be operated by a first entity and a different entity may provide the applications or services for users through the platform.

FIG. 3 is a diagram illustrating a system 300 with which an embodiment may be implemented or through which an embodiment of the services disclosed and/or described herein may be accessed. In accordance with the advantages of an application service provider (ASP) hosted business service system (such as a multi-tenant data processing platform), users of the services may comprise individuals, businesses, or organizations, as non-limiting examples.

A user may access the services using a suitable client. In general, a client device having access to the Internet may be used to provide data to the platform for processing and evaluation and/or obtain an output or execute a strategy based on the executed data processing. A user interfaces with the service platform across the Internet 308 or another suitable communications network or combination of networks. Examples of suitable client devices include desktop computers 303, smartphones 304, tablet computers 305, or laptop computers 306.

System 310 may include a set of data analysis and other services to assist in identifying and extracting data 312, and a web interface server 314, coupled as shown in FIG. 3. It is to be appreciated that either or both the data analysis and other services 312 and the web interface server 314 may be implemented on one or more different hardware systems and components, even though represented as singular units in FIG. 3.

Services 312 may include one or more functions or operations for the processing of a set of data, identifying one or more keywords, entities, or associated contexts, and using that information in further processing or responding to the source text or audio from which were extracted an entity and/or context associated with an entity. This may include use of the extracted data for purposes of routing a request, performing a billing operation, generating a response to an audio or text segment, or other task related to customer support or management, as non-limiting examples.

As examples, in some embodiments, the set of functions, operations or services made available through the platform or system 310 may include:

- Account Management services 316, such as:
  - a process or service to authenticate a user wishing to utilize services available through access to the SaaS platform;
  - a process or service to generate a container or instantiation of the data processing and automated label generation services for that user;
- A set of processes or services 318 to (where as mentioned, in some situations, the processes implemented by execution of the initial steps or stages may be used as part of a configuration process to "set" the parameters for the extraction and understanding of entities and related contextual information from text located in a processing "window" and may have been performed in advance of the current processing and stored as a set of retrievable configuration parameters):
  - Obtain audio segment of speech (from a call received at a call center, as an example) or a set of text (from a chatbot conversation, text message, or email, as examples);
    - If applicable, convert audio segment to text using a speech-to-text conversion process;
  - Determine an alphanumeric string of interest (such as an entity or request);
    - As a non-limiting example, this might be a field label or identifier (such as, but not limited to (or required to include) date of birth, date of service, or a service code);
  - Determine a keyword or keywords of interest in the alphanumeric string-set one or more configuration parameters for an extraction process;
    - This may be part of an iterative process that specifies one or more keywords at a time until all possible keywords of interest in a string are located;
    - In one example embodiment, identifying the keyword or words in the string may include one or more of the following steps, stages, operations, functions, or processes:
      - Given a set of training data or domain of text, determine what content or aspects to extract;
      - Create a set of configuration parameters to extract the contextualized entities (where a contextualized entity is the result of taking an entity and associating it with a context) by setting or defining one or more of the following parameters:
        - Levenshtein threshold (i.e., a value obtained by determining the Levenshtein distance, and which if satisfied, indicates that a keyword (or set of keywords) has been located);
        - Proximity distance;
        - Extraction direction (i.e., forward, backward, or both forward and backward);
        - Context size (expressed as a number of words); and
        - Entity Type or Type (as non-limiting examples, MONEY, DATE, ID, Location, or Organization);
  - For new audio segment or set of text, if the source is text use text, if the source is audio convert it to text using a suitable speech-to-text conversion;
  - Load (e.g., access or retrieve) the configuration (the set of parameters associated with an extraction process);
    - Perform search over the string using a sliding window via Levenshtein;
    - Perform search using a sliding window and proximity search;
      - In general, the two search techniques may be performed in either order, with the first technique applied being based on knowledge regarding the expected characteristics or source of the text being processed. If a keyword or keywords are found using the first technique applied, then it may not be necessary to apply the second technique;

If the keywords are found, go (i.e., find and identify) the "context size" number of words in the direction established by the extraction direction in the configuration parameters;

This new block of text is the context;

As an example, the context is a set of one or more words in a string that are offset a specified amount from a keyword or keywords;

Provide Identified Block of Text (Context) to Entity Extractor-Process Output of Entity Extractor as Needed-Return the Extracted Entity and Associated Context to the Process Flow for Further Use;

If a single entity is found matching the type established in the configuration parameters, then conclude the process found the entity for the matching field in question;

If there are no entities matching the type in the configuration parameters, then continue searching;

If there are multiple entries matching the type in the configuration parameters, then filter down to the entity closest to the keywords;

If there are multiple entities, then the entity that is closest to the keyword's location is determined to be the entity of interest;

This may include filtering, comparing a confidence level to a threshold value, or other suitable evaluation process;

Returning the extracted entity and associated context to the process flow for further use may include on or more of:

Causing a routing (or change in routing) of a request or statement, such as to an appropriate customer service representative, chatbot, source of information, or process flow;

Adjusting/modifying one or more follow-up questions based on the information provided (in this example, the process flow assists in determining/deciding a next round or phase of a conversation or interaction);

Extracting information for a downstream data science or IT task;

Operating as a scheduling assistant by contextualizing times in a text-based conversation and automatically adding them to a calendar;

Administrative services 320, such as:

a process or services to provide platform and services administration—for example, to enable the provider of the services and/or the platform to administer and configure the processes and services provided to users.

The platform or system shown in FIG. 3 may be hosted on a distributed computing system made up of at least one, but likely multiple, "servers." A server is a physical computer dedicated to providing data storage and an execution environment for one or more software applications or services intended to serve the needs of the users of other computers that are in data communication with the server, for instance via a public network such as the Internet. The server, and the services it provides, may be referred to as the "host" and the remote computers, and the software applications running on the remote computers being served may be referred to as "clients." Depending on the computing service(s) that a server offers it could be referred to as a database server, data storage server, file server, mail server, print server, or web server.

FIG. 4 is a diagram illustrating elements or components of an example operating environment 400 with which an embodiment may be implemented. As shown, a variety of clients 402 incorporating and/or incorporated into a variety of computing devices may communicate with a multi-tenant service platform 408 through one or more networks 414. For example, a client may incorporate and/or be incorporated into a client application (e.g., software) implemented at least in part by one or more of the computing devices.

Examples of suitable computing devices include personal computers, server computers 404, desktop computers 406, laptop computers 407, notebook computers, tablet computers or personal digital assistants (PDAs) 410, smart phones 412, cell phones, and consumer electronic devices incorporating one or more computing device components, such as one or more electronic processors, microprocessors, central processing units (CPU), or controllers. Examples of suitable networks 414 include networks utilizing wired and/or wireless communication technologies and networks operating in accordance with any suitable networking and/or communication protocol (e.g., the Internet).

The distributed computing service/platform (which may also be referred to as a multi-tenant data processing platform) 408 may include multiple processing tiers, including a user interface tier 416, an application server tier 420, and a data storage tier 424. The user interface tier 416 may maintain multiple user interfaces 417, including graphical user interfaces and/or web-based interfaces. The user interfaces may include a default user interface for the service to provide access to applications and data for a user or "tenant" of the service (depicted as "Service UI" in the figure), as well as one or more user interfaces that have been specialized/customized in accordance with user specific requirements (e.g., represented by "Tenant A UI", . . . , "Tenant Z UI" in the figure, and which may be accessed via one or more APIs).

The default user interface may include user interface components enabling a tenant or platform administrator to administer the tenant's access to and use of the functions and capabilities provided by the service platform. This may include accessing tenant data, launching an instantiation of a specific application, or causing the execution of specific data processing operations.

Each application server or processing tier 422 shown in the figure may be implemented with a set of computers and/or components including computer servers and processors, and may perform various functions, methods, processes, or operations as determined by the execution of a software application or set of instructions. The data storage tier 424 may include one or more data stores, which may include a Service Data store 425 and one or more Tenant Data stores 426. Data stores may be implemented with any suitable data storage technology, including structured query language (SQL) based relational database management systems (RDBMS).

Service Platform 408 may be multi-tenant and may be operated by an entity to provide multiple tenants with a set of business-related or other data processing applications, data storage, and functionality. For example, the applications and functionality may include providing web-based access to the functionality used by a business to provide services to end-users, thereby allowing a user with a browser and an Internet or intranet connection to view, enter, process, or modify certain types of information.

Such functions or applications are typically implemented by one or more modules of software code/instructions that are maintained on and executed by one or more servers 422 that are part of the platform's Application Server Tier 420. As noted with regards to FIG. 3, the platform system shown in FIG. 4 may be hosted on a distributed computing system made up of at least one, but typically multiple, "servers."

Rather than build and maintain such a platform or system themselves, a business may utilize systems provided by a different entity (such as the assignee). An entity may implement a business system/platform in the context of a multi-tenant platform, where individual instantiations of one or more data processing workflow(s) (such as the text analysis and context extraction services disclosed and/or described herein) are provided to multiple users, with each business (or IVR system, as a further example) representing a tenant of the platform.

An advantage to such multi-tenant platforms is the ability for each tenant to customize their instantiation of the data processing workflow to that tenant's specific business needs or operational methods. Each tenant may be a business or entity that uses the multi-tenant platform to provide business services and functionality to multiple users.

FIG. 5 is a diagram illustrating additional details of the elements or components of the multi-tenant distributed computing service platform of FIG. 4, with which an embodiment may be implemented. In general, an embodiment may be implemented using a set of software instructions that are executed by a suitably programmed processing element (such as a CPU, microprocessor, processor, controller, state machine, or computing device, as non-limiting examples). In a complex system such instructions are typically arranged into "modules" with each such module performing a specific task, process, function, or operation. The entire set of modules may be controlled or coordinated in their operation by an operating system (OS) or other form of organizational platform.

As noted, FIG. 5 is a diagram illustrating additional details of the elements or components 500 of a multi-tenant distributed computing service platform, with which an embodiment may be implemented. The example architecture includes a user interface layer or tier 502 having one or more user interfaces 503. Examples of such user interfaces include graphical user interfaces and application programming interfaces (APIs). Each user interface may include one or more interface elements 504. For example, users may interact with interface elements to access functionality and/or data provided by application and/or data storage layers of the example architecture.

Examples of graphical user interface elements include buttons, menus, checkboxes, drop-down lists, scrollbars, sliders, spinners, text boxes, icons, labels, progress bars, status bars, toolbars, windows, hyperlinks, and dialog boxes. Application programming interfaces may be local or remote and may include interface elements such as parameterized procedure calls, programmatic objects, and messaging protocols.

The application layer 510 may include one or more application modules 511, each having one or more sub-modules 512. Each application module 511 or sub-module 512 may correspond to a function, method, process, or operation that is implemented by the module or sub-module (e.g., a function or process related to providing data processing and services to a user of the platform).

Such function, method, process, or operation may include those used to implement one or more aspects of the disclosed and/or described systems and methods, such as for one or more of the processes or functions described with reference to the Figures (where as mentioned, in some situations, the processes implemented by execution of the initial steps or stages may be used as part of a configuration process to "set" the parameters for the extraction and understanding of entities and related contextual information from text located in a processing "window" and may have been performed in advance of the current processing and stored as a set of retrievable configuration parameters):

- Obtain audio segment of speech (from a call received at a call center, as an example) or a set of text (from a chatbot conversation, text message, or email, as examples);
  - If applicable, convert audio segment to text using a speech-to-text conversion process;
- Determine an alphanumeric string of interest (such as an entity or request);
  - As a non-limiting example, this might be a field label or identifier (such as, but not limited to (or required to include) date of birth, date of service, or a service code);
- Determine a keyword or keywords of interest in the alphanumeric string-set one or more configuration parameters for an extraction process;
  - This may be part of an iterative process that specifies one or more keywords at a time until all possible keywords of interest in a string are located;
  - In one example embodiment, identifying the keyword or words in the string may include one or more of the following steps, stages, operations, functions, or processes:
    - Given a set of training data or domain of text, determine what content or aspects to extract;
    - Create a set of configuration parameters to extract the contextualized entities (where a contextualized entity is the result of taking an entity and associating it with a context) by setting or defining one or more of the following parameters:
      - Levenshtein threshold;
      - Proximity distance;
      - Extraction direction (i.e., forward, backward, or both forward and backward);
      - Context size (expressed as a number of words); and
      - Entity Type or Type (as non-limiting examples, MONEY, DATE, ID, Location, or Organization);
- For new audio segment or set of text, if the source is text use text, if the source is audio convert it to text using a suitable speech-to-text conversion;
- Load (e.g., access or retrieve) the configuration (the set of parameters associated with an extraction process);
  - Perform search over the string using a sliding window via Levenshtein metric;
  - Perform search using sliding window and proximity search;
    - In general, the two search techniques may be performed in either order, with the first technique applied being based on knowledge regarding the expected characteristics or source of the text being processed. If a keyword or keywords are found using the first technique applied, then it may not be necessary to apply the second technique;
  - If the keywords are found, go (i.e., find and identify) the "context size" number of words in the direction established by the extraction direction in the configuration parameters;

- This new block of text is the context;
- As an example, the context is a set of one or more words in a string that are offset a specified amount from a keyword or keywords;

Provide Identified Block of Text (Context) to Entity Extractor-Process Output of Entity Extractor as Needed-Return the Extracted Entity and Associated Context to the Process Flow for Further Use;

- If a single entity is found matching the type established in the configuration parameters, then conclude the process found the entity for the matching field in question;
- If there are no entities matching the type in the configuration parameters, then continue searching;
- If there are multiple entries matching the type in the configuration parameters, then filter down to the entity closest to the keywords;
  - If there are multiple entities, then the entity that is closest to the keyword's location is determined to be the entity of interest;
- This may include filtering, comparing a confidence level to a threshold value, or other suitable evaluation process;
- Returning the extracted entity and associated context to the process flow for further use may include on or more of:
  - Causing a routing (or change in routing) of a request or statement, such as to an appropriate customer service representative, chatbot, source of information, or process flow;
  - Adjusting/modifying one or more follow-up questions based on the information provided (in this example, the process flow assists in determining/deciding a next round or phase of a conversation or interaction);
  - Extracting information for a downstream data science or IT task;
  - Operating as a scheduling assistant by contextualizing times in a text-based conversation and automatically adding them to a calendar.

The application modules and/or sub-modules may include a suitable computer-executable code or set of instructions (e.g., as would be executed by a suitably programmed processor, microprocessor, GPU, TPU, QPU, state machine, or CPU, as examples), such as computer-executable code corresponding to a programming language. For example, programming language source code may be compiled into computer-executable code. Alternatively, or in addition, the programming language may be an interpreted programming language such as a scripting language.

Each application server (e.g., as represented by element 422 of FIG. 4) may include each application module. Alternatively, different application servers may include different sets of application modules. Such sets may be disjoint or overlapping.

The data storage layer (or tier) 520 may include one or more data objects 522 each having one or more data object components 521, such as attributes and/or behaviors. For example, the data objects may correspond to tables of a relational database, and the data object components may correspond to columns or fields of such tables. The data objects may correspond to data records having fields and associated services. The data objects may correspond to persistent instances of programmatic data objects, such as structures and classes. Each datastore in the data storage layer may include each data object. Alternatively, different datastores may include different sets of data objects. Such sets may be disjoint or overlapping.

Note that the example computing environments depicted in FIGS. 3, 4, and 5 are not intended to be limiting examples. Further environments in which an embodiment may be implemented in whole or in part include devices (including mobile devices), software applications, systems, apparatuses, networks, SaaS platforms, IaaS (infrastructure-as-a-service) platforms, or other configurable components that may be used by multiple users for one or more of data entry, data processing, application execution, or data review.

As suggested by this disclosure, disambiguation of entities is related to context. While traditional entity extractors can detect an entity, they are unable contextualize them, and therefore may not provide sufficient information to enable an effective understanding of the extracted data or information. For example, a commercial entity extractor will find dates, but not be able to tell if that date was a birthday, a purchase date, or a payment date.

A machine learning based approach to solving this problem would be to train a model that recognizes both an entity and its associated context. For this to be possible, that context, such as a birthdate or payment date, would need to be annotated and used for training data. However, the process of annotating training data is a resource intensive task (human and/or computationally). Preparing a useable training dataset would therefore require a large amount of time and human resources that are trained in the domain of interest.

As an example, in the medical billing field, one would need sufficient background in the domain to understand how to annotate a dataset. For example, a person or process would need to know that "allowed amounts" and "total covered amounts" are the same thing, but "total paid amounts" represents something different.

At a minimum, one would need thousands of annotated examples to train a model. In contrast, an embodiment of the approach discussed in this disclosure offers an alternative to the conventional approach of preparing a training dataset and training a model. This is because an embodiment does not require such large amounts of training data or for that training data to be annotated. Instead, through a relatively simple configuration policy, an embodiment can operate to disambiguate entities.

This aspect of one or more embodiments provides an advantage in the early-stage automation of a process. A component to early startup development and innovation is managing operational and technical barriers. Early in the lifecycle of a project it is often not possible to gather thousands of real data points that can be annotated. Furthermore, making those annotations would typically not be feasible in terms of human resources, computational resources, or time.

In machine learning (ML) there is a concept termed "weakly labeled data". Using an embodiment may lead to the production of a weakly labeled dataset, that is a dataset not labeled by a human annotator that can still be used to train an effective model. An embodiment typically will not perform a labeling operation with 100% accuracy and therefore the dataset is referred to as "weakly labeled".

Given the existing constraints, an embodiment of the system disclosed and/or described herein could be used to generate a set of examples and associated annotations for use in training a ML model. This is because the results of using an embodiment on a domain would provide a set of annotated training examples in the form of extracted text and an associated label describing an entity and/or context. This data and information could subsequently be used for training a ML model.

For example, suppose that an embodiment is being used to extract data from medical billing related calls to a call center. The process would take raw text and would output contextualized entities, as disclosed and/or described herein. Theoretically, one could take the contextualized entities and the underlying phrases they came from and use that as a self-annotated training set to develop a ML model. To do this, one would line up the contextualized entity with where it came from, and an ML model would then use that to learn the context in which that entity exists.

The disclosure includes the following clauses and embodiments:

1. A method of processing text, comprising:
- obtaining a set of configuration parameters, wherein the set of configuration parameters comprise one or more keywords, and one or more of a Levenshtein distance value, a proximity distance value, an extraction direction, a context size, and an entity type;
- obtaining a set of text for processing;
- performing a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;
- if a keyword is found, then sending a block of text containing the keyword and the number of words specified by the context size configuration parameter in a direction from the keyword specified by the extraction direction parameter to an entity extractor; and
- using an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

2. The method of clause 1, wherein the set of configuration parameters is determined at least in part by:
- determining an alphanumeric string of interest in an example of text;
- determining a keyword or keywords of interest in the alphanumeric string; and
- setting one or more configuration parameters for entity identification and extraction based on the keywords and their location in the example of text.

3. The method of clause 1, further comprising converting a segment of speech into the set of text prior to obtaining the set of text for processing.

4. The method of clause 2, wherein the example of text is obtained, and the set of configuration parameters are determined from text that is obtained prior to obtaining the set of text for processing.

5. The method of clause 2, wherein the example of text and the set of text for processing are obtained from a same text or audio session.

6. The method of clause 1, wherein the set of configuration parameters are determined by one or more of a user and a trained model.

7. The method of clause 1, wherein the extraction direction is one of forward, backward, or both forward and backward.

8. The method of clause 1, further comprising processing the output of the entity extractor to provide an extracted entity by one or more of:
- concluding the processing found the entity matching the type established in the configuration parameters if a single entity is found matching the type established in the configuration parameters;
- continuing to search if no entities are found matching the type established in the configuration parameters;
- reducing multiple entities to an entity closest to the keyword or keywords if multiple entries are found matching the type established in the configuration parameters; or
- determining that an entity that is closest to a location of a keyword or keywords is an entity matching the type established in the configuration parameters.

9. The method of clause 1, further comprising extracting a plurality of entities and associated blocks of text and using those as training data for a model, wherein the extracted entity is used as a label for the associated block of text.

10. The method of clause 1, wherein the configuration parameters further comprise one or more of a Normalization type instructing how to normalize an entity and an instruction to skip the entity extraction processing and instead extract content found between a first and a second keyword or between a first and a second set of keywords.

11. A system, comprising:
- one or more electronic processors configured to execute a set of computer-executable instructions; and
- one or more non-transitory electronic data storage media containing the set of computer-executable instructions, wherein when executed, the instructions cause the one or more electronic processors to
  - obtain a set of configuration parameters, wherein the set of configuration parameters comprise one or more keywords, and one or more of a Levenshtein distance value, a proximity distance value, an extraction direction, a context size, and an entity type;
  - obtain a set of text for processing;
  - perform a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;
  - if a keyword is found, then send a block of text containing the keyword and the number of words specified by the context size configuration parameter in a direction from the keyword specified by the extraction direction parameter to an entity extractor; and
- use an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

12. One or more non-transitory computer-readable media comprising a set of computer-executable instructions that when executed by one or more programmed electronic processors, cause the processors to:
- obtain a set of configuration parameters, wherein the set of configuration parameters comprise one or more keywords, and one or more of a Levenshtein distance value, a proximity distance value, an extraction direction, a context size, and an entity type;

obtain a set of text for processing;

perform a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;

if a keyword is found, then send a block of text containing the keyword and the number of words specified by the context size configuration parameter in a direction from the keyword specified by the extraction direction parameter to an entity extractor; and use an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

The disclosed and/or described system and methods can be implemented in the form of control logic using computer software in a modular or integrated manner. Based on the disclosure and teachings provided herein, a person of ordinary skill in the art will know and appreciate other ways and/or methods to implement the present invention using hardware and/or a combination of hardware and software.

In some embodiments, certain of the methods, models, processes, operations, or functions disclosed and/or described herein (such as the entity extraction processing) may be embodied in the form of a trained neural network or other form of model derived from a machine learning algorithm. The neural network or model may be implemented by the execution of a set of computer-executable instructions and/or represented as a data structure. The instructions may be stored in (or on) a non-transitory computer-readable medium and executed by a programmed processor or processing element. A neural network or deep learning model may be characterized in the form of a data structure in which are stored data representing a set of layers, with each layer containing a set of nodes, and with connections (and associated weights) between nodes in different layers. The neural network or model operates on an input to provide a decision, prediction, inference, or value as an output.

The set of instructions may be conveyed to a user through a transfer of instructions or an application that executes a set of instructions over a network (e.g., the Internet). The set of instructions or an application may be utilized by an end-user through access to a SaaS platform, self-hosted software, on-premise software, or a service provided through a remote platform.

In general terms, a neural network may be viewed as a system of interconnected artificial "neurons" or nodes that exchange messages between each other. The connections have numeric weights that are "tuned" during a training process, so that a properly trained network will respond correctly when presented with an image, pattern, or set of data. In this characterization, the network consists of multiple layers of feature-detecting "neurons", where each layer has neurons that respond to different combinations of inputs from the previous layers.

Training of a network is performed using a "labeled" dataset of inputs in an assortment of representative input patterns (or datasets) that are associated with their intended output response. Training uses methods to iteratively determine the weights for intermediate and final feature neurons. In terms of a computational model, each neuron calculates the dot product of inputs and weights, adds a bias, and applies a non-linear trigger or activation function (for example, using a sigmoid response function).

Machine learning (ML) is used to analyze data and assist in making decisions in multiple industries. To benefit from using machine learning, a machine learning algorithm is applied to a set of training data and labels to generate a "model" which represents what the application of the algorithm has "learned" from the training data. Each element (or example) in the form of one or more parameters, variables, characteristics, or "features" of the set of training data is associated with a label or annotation that defines how the element should be classified by the trained model. A machine learning model can predict or infer an outcome based on the training data and labels and be used as part of a decision process. When trained, the model will operate on a new element of input data to generate the correct (or most likely correct) label or classification as an output.

In some examples, a neural network may be implemented based on multiple and/or different types of topologies and/or architectures including deep neural networks with fully connected (e.g., dense) layers, Long Short-Term Memory (LSTM) layers, convolutional layers, Temporal Convolutional Layers (TCL), other suitable types of deep neural network topology and/or architectures, or a combination thereof.

A neural network may have different types of output layers including, without limitation, output layers with logistic sigmoid activation functions, hyperbolic tangent activation functions, linear units, rectified linear units, other suitable types of nonlinear units, or a combination thereof.

The software components, methods, elements, operations, processes, or functions disclosed and/or described herein may be implemented as software code to be executed by a processor using a suitable computer language such as Python, Java, Javascript, C, C++, or Perl using conventional or object-oriented techniques. The software code may be stored as a series of computer-executable instructions, or commands in (or on) a non-transitory computer-readable medium, such as a random-access memory (RAM), a read only memory (ROM), a magnetic medium such as a hard-drive, or an optical medium such as a CD-ROM.

In this context, a non-transitory computer-readable medium is a medium suitable for the storage of data or an instruction set aside from a transitory waveform. A computer-readable medium may reside on or within a single computational apparatus or may be present on or within different computational apparatuses within a system or network.

According to one example implementation, the term processing element or processor, as used herein, may be a central processing unit (CPU), or conceptualized as a CPU (such as a virtual machine). In this implementation, the CPU, or a device in which the CPU is incorporated may be coupled, connected, and/or in communication with one or more peripheral devices, such as a display. In another example implementation, the processing element or processor may be incorporated into a mobile computing device, such as a smartphone or tablet computer.

The non-transitory computer-readable storage medium referred to herein may include a number of physical drive units, such as a redundant array of independent disks (RAID), a flash memory, a USB flash drive, an external hard disk drive, thumb drive, pen drive, key drive, a High-Density Digital Versatile Disc (HD-DV D) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies.

Such computer-readable storage media allow the processing element or processor to access computer-executable processing steps or stages, application programs and the like, stored on removable and non-removable memory media, to off-load data from a device or to upload data to a device. As mentioned, with regards to the embodiments disclosed and/or described herein, a non-transitory computer-readable medium may include almost any structure, technology, or method apart from a transitory waveform or similar medium.

Example implementations of the disclosure are described herein with reference to block diagrams of systems, and/or flowcharts or flow diagrams of functions, operations, processes, or methods. One or more blocks of the block diagrams, or one or more stages or steps of the flowcharts or flow diagrams, and combinations of blocks in the block diagrams and stages or steps of the flowcharts or flow diagrams may be implemented by computer-executable instructions. In some embodiments, one or more of the blocks, or stages or steps may not need to be performed in the order presented or may not need to be performed at all.

The computer-executable program instructions may be loaded onto a general-purpose computer, a special purpose computer, a processor, or other programmable data processing apparatus to produce a specific example of a machine. In this situation, the instructions that are executed by the computer, processor, or other programmable data processing apparatus implement one or more of the functions, operations, processes, or methods disclosed and/or described herein.

The computer program instructions may also (or instead) be stored in (or on) a computer-readable memory that can direct a computer or other programmable data processing apparatus to function in a specific manner. In this embodiment, the instructions stored in the computer-readable memory represent an article of manufacture including instruction means that implement one or more of the functions, operations, processes, or methods disclosed and/or described herein.

While embodiments of the disclosure have been described in connection with what is presently considered to be the most practical form(s) of implementation, it is understood that embodiments are not limited to the disclosed implementations. The disclosed implementations are intended to cover various modifications and equivalent arrangements included within the scope of the appended claims. Although specific terms are employed herein, they are used in a generic and descriptive sense only and not for purposes of limitation.

This written description includes examples to represent possible implementations of one or more embodiments of the disclosure, and to enable a person skilled in the art to practice those implementations, including making and using devices or systems and performing the incorporated methods. The patentable scope of an embodiment of the disclosure is defined in the claims, and may include other examples that occur to those skilled in the art. Such other examples are within the scope of the claims if they have structural and/or functional elements that do not differ from the literal language of the claims, or if they include structural and/or functional elements with insubstantial differences from the literal language of the claims.

All references, including publications, patent applications, and patents cited herein are hereby incorporated by reference to the same extent as if each reference were individually and specifically indicated to be incorporated by reference and/or were set forth in its entirety herein.

The use of the terms "a" and "an" and "the" and similar references in the specification and in the claims are to be construed to cover both the singular and the plural, unless otherwise indicated or clearly contradicted by context. The terms "having," "including," "containing" and similar references in the specification and in the claims are to be construed as open-ended terms (e.g., meaning "including, but not limited to,") unless otherwise noted.

Recitation of ranges of values herein are intended to serve as a shorthand method of referring individually to each separate value inclusively falling within the range, unless otherwise indicated, and each separate value is incorporated into the specification as if it were individually recited. All methods disclosed and/or described herein can be performed in any suitable order unless otherwise indicated or clearly contradicted by context.

The use of all examples or exemplary language (e.g., "such as") herein is intended to better illuminate embodiments of the disclosure and do not pose a limitation to the scope of the claims. No language in the specification should be construed as indicating any non-claimed element as essential to each embodiment of the disclosure.

As used herein (i.e., in the claims, figures, and specification), the term "or" is used inclusively to refer to items in the alternative and in combination.

Different arrangements of the components, elements, steps, or stages illustrated in the drawings and/or described herein, as well as those not shown or described are possible. Similarly, some features and sub-combinations are useful and may be employed without reference to other features and sub-combinations. Embodiments of the disclosure have been described for illustrative and not for restrictive purposes, and alternative embodiments may be apparent to a reader of the disclosure. Accordingly, embodiments and modifications may be made without departing from the scope of the claims below.

That which is claimed is:

1. A method of processing text, comprising:

obtaining a set of configuration parameters, wherein the set of configuration parameters comprise one or more keywords, and one or more of a Levenshtein distance value, a proximity distance value, an extraction direction, a context size, and an entity type;

obtaining a set of text for processing;

performing a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;

if a keyword is found, then sending a block of text containing the keyword and the number of words specified by the context size configuration parameter in a direction from the keyword specified by the extraction direction parameter to an entity extractor; and using an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

2. The method of claim 1, wherein the set of configuration parameters is determined at least in part by:

determining an alphanumeric string of interest in an example of text;

determining a keyword or keywords of interest in the alphanumeric string; and setting one or more configuration parameters for entity identification and extraction based on the keywords and their location in the example of text.

3. The method of claim 1, further comprising converting a segment of speech into the set of text prior to obtaining the set of text for processing.

4. The method of claim 2, wherein the example of text is obtained, and the set of configuration parameters are determined from text that is obtained prior to obtaining the set of text for processing.

5. The method of claim 2, wherein the example of text and the set of text for processing are obtained from a same text or audio session.

6. The method of claim 1, wherein the set of configuration parameters are determined by one or more of a user and a trained model.

7. The method of claim 1, wherein the extraction direction is one of forward, backward, or both forward and backward.

8. The method of claim 1, further comprising processing the output of the entity extractor to provide an extracted entity by one or more of:

concluding the processing found the entity matching the type established in the configuration parameters if a single entity is found matching the type established in the configuration parameters;

continuing to search if no entities are found matching the type established in the configuration parameters;

reducing multiple entities to an entity closest to the keyword or keywords if multiple entries are found matching the type established in the configuration parameters; or determining that an entity that is closest to a location of a keyword or keywords is an entity matching the type established in the configuration parameters.

9. The method of claim 1, further comprising extracting a plurality of entities and associated blocks of text and using those as training data for a model, wherein the extracted entity is used as a label for the associated block of text.

10. The method of claim 1, wherein the configuration parameters further comprise one or more of a Normalization type instructing how to normalize an entity and an instruction to skip the entity extraction processing and instead extract content found between a first and a second keyword or between a first and a second set of keywords.

11. A system, comprising:

one or more electronic processors configured to execute a set of computer-executable instructions; and one or more non-transitory electronic data storage media containing the set of computer-executable instructions, wherein when executed, the instructions cause the one or more electronic processors to obtain a set of configuration parameters, wherein the set of configuration parameters comprise one or more keywords, and one or more of a Levenshtein distance value, a proximity distance value, an extraction direction, a context size, and an entity type;

obtain a set of text for processing;

perform a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;

if a keyword is found, then send a block of text containing the keyword and the number of words specified by the context size configuration parameter in a direction from the keyword specified by the extraction direction parameter to an entity extractor; and use an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

12. The system of claim 11, wherein the set of configuration parameters is determined at least in part by:

determining an alphanumeric string of interest in an example of text;

determining a keyword or keywords of interest in the alphanumeric string; and setting one or more configuration parameters for entity identification and extraction based on the keywords and their location in the example of text.

13. The system of claim 11, wherein the instructions further cause the one or more processors to convert a segment of speech into the set of text prior to obtaining the set of text for processing.

14. The system of claim 12, wherein the example of text is obtained, and the set of configuration parameters are determined from text that is obtained prior to obtaining the set of text for processing.

15. The system of claim 12, wherein the example of text and the set of text for processing are obtained from a same text or audio session.

16. The system of claim 11, wherein the set of configuration parameters are determined by one or more of a user and a trained model.

17. The system of claim 11, wherein the extraction direction is one of forward, backward, or both forward and backward.

18. The system of claim 11, wherein the instructions further cause the one or more processors to extract a plurality of entities and associated blocks of text and use those as training data for a model, wherein the extracted entity is used as a label for the associated block of text.

19. One or more non-transitory computer-readable media comprising a set of computer-executable instructions that when executed by one or more programmed electronic processors, cause the processors to:

obtain a set of configuration parameters, wherein the set of configuration parameters comprise one or more keywords, and one or more of a Levenshtein distance value, a proximity distance value, an extraction direction, a context size, and an entity type;

obtain a set of text for processing;

perform a search over the set of text using one or more of Levenshtein and proximity distance search to identify at least one of the one or more keywords, wherein the Levenshtein distance value parameter is applied if Levenshtein distance search is used, and the proximity distance value parameter is applied if proximity distance search is used;

if a keyword is found, then send a block of text containing the keyword and the number of words specified by the context size configuration parameter in a direction from the keyword specified by the extraction direction parameter to an entity extractor; and use an entity extracted by the entity extractor and the block of text to perform an operation, wherein the operation is one of routing a request or statement represented by the block or set of text to a customer service representative, assisting a user to navigate through one or more branches or prompts of an interactive voice response system, or initiating an event or process.

20. The one or more non-transitory computer-readable media of claim 19, wherein the set of configuration parameters is determined at least in part by:

determining an alphanumeric string of interest in an example of text;

determining a keyword or keywords of interest in the alphanumeric string; and setting one or more configuration parameters for entity identification and extraction based on the keywords and their location in the example of text.

* * * * *